Figure 1:
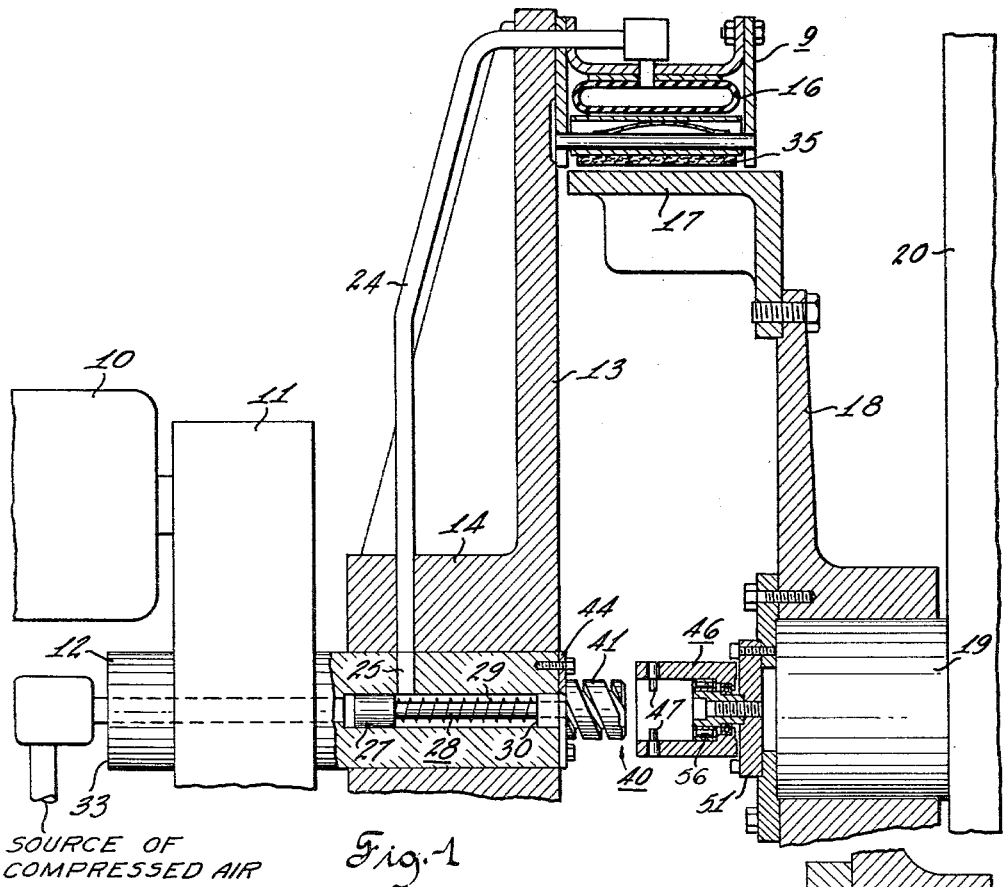

April 27, 1965   J. W. TUCKER, JR   3,180,467
SAFETY DEVICE FOR AIR CLUTCH
Filed Oct. 2, 1962

Inventor
James W. Tucker, Jr.
By Robert B. Benson
Attorney 3,180,467
SAFETY DEVICE FOR AIR CLUTCH
James W. Tucker, Jr., Lake Park, Fla., assignor to Allis
Chalmers Manufacturing Company, Milwaukee, Wis.
Filed Oct. 2, 1962, Ser. No. 227,849
6 Claims. (Cl. 192—88)

This application relates generally to an inching device used in combination with large motors on installations such as steel rolling mills. More specifically this invention relates to a safety device which prevents the transmission of torque from the high speed driving motor back through the clutch mechanism to the inching motor.

In large steel mills and other similar applications, small induction motors frequently called inching motors are used to turn large driving motors at a very slow speed. This is done to position the motor shafts to receive the rolls to be driven and to start the motors rolling before they are energized by their own line voltage. The latter avoids the large surges of current usually associated with starting large motors. The inching motor is usually a small induction motor and drives the large motor through a gear reducer and clutch. The gear reducers have a high speed ratio frequently as much as 100 to 1. Therefore, if the clutch were accidentally engaged when the driving motor was going at rated speed of 500 revolutions per minute, the inching motor in turn would be going 50,000 r.p.m. which would literally tear the motor apart. A safety device is especially needed with large motor drives in steel mills that have such a high inertia that they require 20 to 30 minutes to coast to a stop. The inching motor and gear reducer could be ruined if the clutch were engaged during the time when the drive motor was coasting to a stop.

Many forms of automatically disengaging or overriding clutches have been used to prevent the reverse drive from the driving motor to the inching motor. Most of these are extremely expensive and relatively ineffective in protecting the gear reducer and the inching motor. Many of these devices required an operator on hand to be sure that all conditions were just right before starting the inching motor.

Applicant proposes to overcome the problem cited above by providing an inching motor drive having a remotely controlled, pneumatically operated clutch and an engaging mechanism which prevents the operation of the air clutch when the speed of the driving motor exceeds that of the inching motor. Furthermore, the engaging mechanism is automatically disengaged to reset itself each time the clutch is disengaged. This is accomplished by providing the engaging mechanism with a self-releasing screw for connecting the clutch control and the drive motor in such a relationship that when the speed of the driving motor exceeds the speed of the screw, which is rotating at the same speed as the clutch control, the screw cannot thread its associated member on the drive motor and if engaged it is automatically unthreaded therefrom.

Therefore it is the object of this invention to provide a new and improved inching device for large motor drives.

Another object of this invention is to provide a new and improved safety engaging device for inching drives for large motors.

Another object of this invention is to provide an inching motor drive which cannot power the drive motor when the speed of the drive motor exceeds that of the driving member of the clutch.

Figure 2:
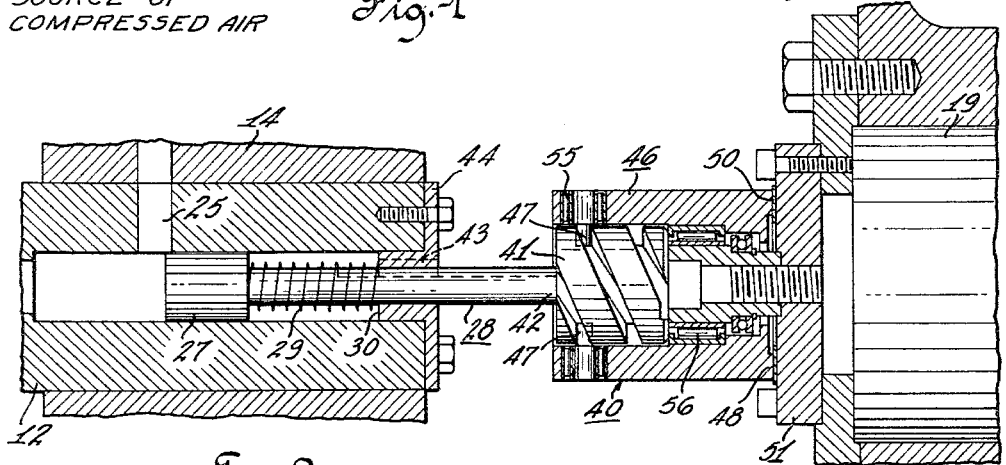

Other objects and advantages of this invention will be apparent from the following description when read in connection with the accompanying drawings in which:

FIG. 1 is a side elevation view partially in section showing the clutch and the safety engaging mechanism of this invention in the disengaged position; and FIG. 2 is an enlarged view of the engaging mechanism of this invention in the engaged position.

Referring more specifically to the drawings, an inching motor 10 is connected to a speed reducer 11 having hollow output shaft 12. An air clutch 9 is provided for connecting the speed reducer shaft 12 to a drive motor. The clutch 9 comprises a spider 13 connected to a hub 14 which is mounted on the output shaft 12. Connected to the outer periphery of the spider 13 is an inflatable annular member 16 which is positioned radially outward from a friction engaging ring 17 which in turn is attached to a second spider 18 which is directly connected to the shaft 19 of the drive motor 20. Hence the inflatable member 16 becomes the driving member and the ring 17 the driven member of the clutch.

Conduits 24 are connected between radial ports 25 in the hollow shaft 12 and the inflatable member 16 for conducting compressed air to the inflatable member to actuate the clutch 9. A slidable piston 27 with an axially extending shaft 28 is mounted in the hollow shaft 12 and a coil spring 29 surrounds the piston shaft 28 between the outboard side of the piston 27 and a shoulder 30 at the inboard end of the hollow shaft. Suitable means such as a compressor are connected to the outboard end 33 of the speed reducer shaft 12 for providing compressed air into the hollow shaft to force the piston axially along the shaft to a position whereby the ports 25 in the hollow shaft are open to the compressed air. In this position compressed air is forced into the inflatable member so that is forces the annular shoe 35 to engage the friction ring 17 to operate the clutch and transmit torque from the speed reducer to the shaft of the drive motor 20.

The safety engaging mechanism 40 of this invention is positioned between the output shaft of the speed reducer and the end of the drive shaft 19 of the motor 20. More specifically as shown in the enlarged view, FIG. 2, the engaging mechanism comprises a long lead self-unthreading screw member 41 which is attached to the inboard end 42 of the piston shaft 28. A self-unthreading or self-releasing screw is one whose lead angle is such that its tangent is greater than the coefficient of friction of the engaging mechanism. The piston shaft 28 is in turn connected by a key 43 and hub 44 to the output shaft 12 of the speed reducer. A sleeve housing 46 is positioned opposite the end of the self-releasing screw 41 and has at least one but preferably two engaging pins 47 extending radially inward from the sleeve housing. The rear end 48 of the sleeve housing 46 is positioned adjacent a friction surface 50 on a plate 51 which is in turn attached to the shaft 19 of the driving motor 20. The screw member 41 is threaded so that when the speed reducer shaft 12 is greater than the speed of the sleeve housing 46 it will automatically thread itself into the housing thereby pulling the piston shaft 28 and piston 27 axially through the bore of the hollow shaft 12 to a position beyond the ports 25 to permit air flow through the ports and conduit 24 into the inflatable member 16. The force of the screw 41 against the engaging pins 47 forces the sleeve housing into engagement with the friction surface 50. The sleeve housing does not slip relative to the friction surface while the screw is threaded into the sleeve housing. However, after the screw is threaded into the housing 46 it causes the housing to rotate and slip relative to the friction surface 50 because it is incapable of transmitting sufficient torque to cause the motor 20 and shaft 19 to rotate. On the other hand, when the clutch is engaged the drive motor shaft 19 is running at the same speed as the speed reducer shaft 12. In this situation the sleeve housing 46 is held in contact with the friction surface and rotates at the same speed as the motor shaft and the speed reducer shaft.

Hence is can be seen that when the inching motor is energized and the compressed air turned on the screw 41 will be forced to hit against the engaging pins of the sleeve housing. If this occurs when the output shaft 12 of the speed reducer 11 is going faster than the drive motor 20 then the male screw member 41 will thread the sleeve housing 46 pulling the piston 27 axially through the bore of the shaft 12 and opening the ports 25. However, if the mill motor is going faster than the screw 41, the screw will be unable to thread its way through the sleeve housing and the piston 27 cannot be pulled past the ports to open the ports and hence the clutch cannot be energized. Furthermore, if the screw member is threaded into the sleeve housing at a time when the air pressure on the clutch is released, and the speed of the reducer shaft is less than the speed of the mill motor, the screw member 41 will be automatically unthreaded from the sleeve housing 46 causing the piston 27 to move axially toward the outboard end of the reducer shaft 12 beyond the ports 25 thereby resetting itself for another cycle of operation.

The unthreading of the screw from the sleeve is due to two factors or a combination of them. First, when the piston 27 moves to the inboard end of the shaft 12 it compresses the coil spring 29. This spring is then exerting a force on the screw through the piston 27 and piston shaft 28, that would tend to pull the screw out of the sleeve except for the greater force of the air pressure on the piston. Hence when the air pressure is released, the coil spring takes over and pulls the screw 41 out of the sleeve.

The second factor that tends to unthread the screw from the sleeve is the speed differential between the sleeve 46 and the screw 41. When the sleeve is rotating sufficiently faster than the screw to overcome the friction drag between the pins and the screw, the sleeve will unthread itself from the screw thereby moving the screw out of the sleeve and resetting it for another operation. This particular feature prevents the accidental reengagement of the clutch 9 at a time when the drive motor 20 is running faster than the speed reducer shaft 12 such as when the drive motor is coasting to a stop.

To assure that the screw 41 will always unthread itself from the sleeve housing the male screw is provided with a long lead thread so that it becomes a self-unthreading or self-releasing screw as defined above. For example, a lead of 2½ inches on a 2½ inch diameter shaft has been found satisfactory. Also, the engaging pins in the sleeve housing are mounted in an antifriction device such as the illustrated needle bearings 55 to reduce to a minimum the amount of frictional drag between the engaging pins 47 and the screw 41. Furthermore, the sleeve housing 46 is also mounted on bearings 56 so as to insure that the thrust transferred from the drive motor shaft 19 to the sleeve housing will be sufficient to cause sleeve housing to continue rotating at the speed of the drive motor until the screw member has been unthreaded. If these members were not made to slide freely sufficient friction may be built up between the engaging pins 47, the male screw 41 and the sleeve housing 46 to cause the sleeve housing to slide relative to the friction surfaces 50 and thereby slow down and rotate at the same speed as the male screw member. This, of course, would prevent the unthreading of the screw from the engaging pins and the sleeve housing to reset the engaging mechanism for another operation.

In operation the compressed air is supplied from the source to the speed reducer shaft 12 and the inching motor 10 is started. Simultaneously, the speed reducer shaft begins to rotate and a pressure is applied on the piston 27 tending to force it axially to the inboard side of the shaft. This causes the screw member 41 to bump up against the engaging pins 47 in the sleeve housing 46. As mentioned above, if the male screw member 41 is rotating faster than the sleeve housing 46 it automatically threads itself into the sleeve housing and forces the housing against the friction surface 50. The threading action plus the air pressure moves the piston axially through bore of the shaft 12 to a position where it uncovers the ports 25 allowing the compressed air to flow through the ports and conduits 24 into the inflatable member 16. The movement of the piston 27 also compresses the coil spring 29 against the shoulder 30. As the inflatable member is filled with compressed air, it forces the shoe 35 to grip the friction ring 17 thereby transmitting torque from the speed reducer shaft to drive motor shaft through the clutch. The drive motor is then driven at a slow speed by the inching motor until it is desired to stop the drive motor or operate it under its own power. At this time the compressed air is turned off releasing the pressure on the piston 27. The coil spring 29 is exerting a pressure on the piston tending to move the outboard end of the shaft 12. This force also pulls the male screw out of engagement with the sleeve housing. If for any reason the coil spring should fail to pull the screw from the sleeve housing, the screw will unthread itself from the sleeve as the speed of the drive motor and hence the sleeve housing 46 which engages the motor shaft 19 through the friction surface 50 exceeds the speed of the reducer shaft which is connected by key 43 and piston shaft 28 to the screw member 41. The screw will be unthreaded when the speed differential between the screw 41 and sleeve 46 becomes great enough even though they are both rotating in the same direction. As mentioned above, it is very important at this point to have a very small frictional drag between the sleeve and the screw.

Although but one embodiment of the present invention has been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A safety device for a clutch adapted to engage a driven member comprising: a control mechanism for engaging and disengaging a clutch, said mechanism including an element slidable between a closed position in which said clutch is disengaged and an open position in which said clutch is engaged, a self-releasing screw member connected to said element, a sleeve member adapted to be connected to and rotatable with the driven member, said sleeve member having a pin positioned to engage the thread on said screw member whereby when the speed of said sleeve member exceeds the speed of said screw said pin prevents said screw from threading said sleeve thereby preventing said element from moving to said open position to engage said clutch.

2. In combination a safety device and a clutch comprising: a clutch adapted to engage a driven member, a control mechanism for engaging and disengaging said clutch, said mechanism including an element slidable between a closed position in which said clutch is disengaged and an open position in which said clutch is engaged, a self-releasing screw member connected to said element, a sleeve member adapted to be connected to and rotatable with a driven member, said sleeve member having a pin positioned to engage the thread on said screw member whereby when the speed of said driven member exceeds the speed of said screw said pin prevents said screw from threading said sleeve thereby preventing said element from moving to said open position to engage said clutch.

3. In combination a safety device and an air clutch comprising: an air clutch adapted to engage a driven member, a control mechanism for engaging and disengaging said air clutch, said mechanism including a piston slidable between a closed position and an open position to admit air to said clutch, a self-releasing screw member connected to said piston, a sleeve member adapted to be connected to and rotatable with said driven member, said sleeve member having a pin positioned to engage the thread on said screw member whereby when the speed of the sleeve exceeds the speed of said screw said pin prevents said screw from threading said sleeve thereby preventing said piston from moving to said open position to admit air to said clutch.

4. In combination a safety device and an air clutch comprising: an air clutch adapted to engage a driven member, a control mechanism for engaging and disengaging said air clutch, said mechanism including a piston slidable between a closed position and an open position to admit air to said clutch, resilient means engaging said piston and urging it toward said closed position, a self-releasing screw member connected to said piston, a sleeve member connected to and rotatable with said driven member, said sleeve member having a pin positioned to engage the thread on said screw member whereby when the speed of said sleeve exceeds the speed of said screw said pin prevents said screw from threading said sleeve thereby preventing said piston from moving to said open position to admit air to said air clutch, and when the speed of said screw exceeds the speed of said sleeve, said screw threads said pin and said sleeve to pull said piston to the open position and thereby admit air to said clutch and cause said clutch to engage said driven member.

5. In combination a safety device and an air clutch comprising: an air clutch connected to a hollow shaft and adapted to engage a driven member, a control mechanism for engaging and disengaging said air clutch, said mechanism including a piston mounted in and rototable with said hollow shaft and being slidable therein between a closed position and an open position to admit air to said clutch, a shaft extending from one side of said piston through the bore of said hollow shaft, a self-releasing screw member connected to said piston shaft, a coil spring surrounding said piston shaft and connected to one end of said hollow shaft for urging said piston to said closed position, a source of compressed air connected to the other end of said hollow shaft to exert a force on said piston opposite the force of said spring, a sleeve member connected to and rotatable with said driven member, said sleeve member having a pin mounted therein and extending into the bore of said sleeve to engage the thread on said screw member whereby when the speed of said driven member exceeds the speed of said screw said pin prevents said screw from threading said sleeve thereby preventing said piston from moving to said open position to energize said air clutch, and when the speed of said screw exceeds the speed of said sleeve, said screw threads said pin and said sleeve to pull said piston to the open position and thereby energize said clutch, and when the compressed air is released said spring causes said screw to unthread from said sleeve and move said piston back to the closed position.

6. In combination a safety clutch and an inching motor drive comprising: an inching motor, a speed reducer operatively connected to said inching motor, said speed reducer having a hollow shaft with radial ports formed therein, a piston slidably mounted in the bore of said speed reducer shaft, a shaft extending from said piston through said bore toward the inboard end of said speed reducer shaft, said piston shaft being connected to said speed reducer shaft for rotation therewith, a source of compressed air connected to the outboard end of said speed reducer shaft, resilient means for biasing said piston toward said outboard end of said speed reducer shaft and to position piston intermediate said ports and said source of compressed air in the relaxed position, a pneumatic clutch for connecting said speed reducer to a drive motor, said pneumatic clutch having conduits for connecting it to said ports in said speed reducer shaft, and a safety engaging device comprising a self-releasing screw connected to said piston shaft and positioned intermediate said speed reducer shaft and said drive motor, a sleeve housing positioned opposite said screw and adapted to engage a friction surface connected to said drive motor, an engaging pin mounted in said sleeve and extending radially into the bore of said sleeve, whereby when said piston and said screw are moved axailly by said compressed air, said screw will engage said pin and said pin will prevent said screw from threading said sleeve when said sleeve is rotating faster than said screw and thread said screw into said sleeve housing when said reducer shaft is rotating faster than said sleeve, and when the air pressure on said piston is released said resilient means will force said piston to move axially past said air ports and unthread said screw from said sleeve.

References Cited by the Examiner

UNITED STATES PATENTS

| | | |
|---|---|---|
| 2,058,550 | 10/36 | Baits. |
| 2,548,268 | 4/51 | Metsger. |
| 2,566,445 | 9/51 | Gilbert et al. _____ 192—42 X |
| 2,870,891 | 1/59 | Eakin et al. |
| 2,960,202 | 11/60 | Stevens et al. _____192—106 X |

DAVID J. WILLIAMOWSKY, *Primary Examiner.*